United States Patent [19]
Stockton

[11] Patent Number: 5,978,739
[45] Date of Patent: Nov. 2, 1999

[54] DISCONNECT INFORMATION AND MONITORING SYSTEM FOR DYNAMICALLY POSITIONED OFFSHORE DRILLING RIGS

[76] Inventor: Thomas R. Stockton, 13031 Via Del Toro, San Diego, Calif. 92064-1927

[21] Appl. No.: 08/949,942

[22] Filed: Oct. 14, 1997

[51] Int. Cl.⁶ ................................................. G06F 19/00
[52] U.S. Cl. ............................................ 702/6; 701/116
[58] Field of Search ......................... 702/6, 9; 405/169, 405/170, 195.1, 201, 202, 224.2, 224.3, 224.4; 166/350, 353, 354, 355, 359, 367; 175/7; 701/116

[56] References Cited

U.S. PATENT DOCUMENTS

| | | | |
|---|---|---|---|
| 4,317,174 | 2/1982 | Dean | 405/195.1 |
| 4,712,620 | 12/1987 | Lim et al. | 166/355 |

*Primary Examiner*—Donald E. McElheny, Jr.
*Attorney, Agent, or Firm*—John R. Ross; John R. Ross, III

[57] ABSTRACT

A disconnect information and monitoring system for a dynamically positioned offshore drilling rig at an ocean surface rig location over a wellhead on the sea floor. The system includes a data processing computer, a GPS monitor, a flex joint angle monitor, a slip joint stroke position monitor, and signal equipment to feed signals from the GPS monitor, the flex joint angle monitor, and the slip joint stroke position monitor to the data processing computer. The computer is programmed with software to analyze signal data from the GPS monitor, the flex joint angle monitor and the slip joint stroke position monitor and to present the results of the analysis on the computer monitor so as to provide visual guidance to operators of the rig. In a preferred embodiment a riser top angle monitor and signal equipment for feeding signals from the riser top angle monitor to the data processing computer is also provided. In this preferred embodiment the computer is further programmed display on a computer monitor a symbol representing the rig position relative to the wellhead and to display on the monitor symbols representing limits beyond which the rig should not travel to avoid damage to drill equipment. Another preferred embodiment provides a system and method for determining the curvature profile of the riser.

22 Claims, 5 Drawing Sheets

DISCONNECT INFORMATION AND MONITORING SYSTEM FOR DYNAMICALLY POSITIONED OFFSHORE DRILLING RIGS

This invention relates to offshore oil drilling rigs and in particular to dynamically positioned drilling rigs for the drilling of deep-water oil and gas wells.

BACKGROUND OF THE INVENTION

Equipment and techniques for drilling oil and gas wells in deep water are well established. The typical practice, as shown in FIG. 1, utilizes floating drilling rig 1, from which drill string 2 is extended to the sea floor. At depths greater than 2000 feet, the vessel is typically dynamically positioned (i.e., the vessel's propulsion is controlled by a computer system to keep the vessel on location without the use of anchors). Drill bit 3 is attached to the lower end of drill string 2, and the drill string/bit combination is driven in rotation by top-drive rotary unit 4 from rig 1 to drill the well bore into the ocean floor. Once the initial well bore is established, blowout preventer 5 is lowered to the sea floor to sit above the well. Floating drilling rig 1 and blowout preventer 5 are connected by riser pipe 6 extending from beneath drill floor 7 to the top of blowout preventer 5 on the sea floor. The riser is thus fixed to blowout preventer 5 at the lower end while the upper end must move both horizontally and vertically with the motions of the floating platform. To accommodate platform movement, the riser is connected to blowout preventer 5 at the bottom through flexjoint 8 which allows for riser tilt angles with respect to blowout preventer 5 of up to a maximum of about 10°, and to floating platform drill floor 7 at the surface of the sea through a slipjoint/tensioner combination which allows extension and contraction of riser pipe 6 length to accommodate vessel horizontal and vertical movement. The slipjoint is made up of two parts, inner barrel 9 which is attached to the underside of the floating platform drill floor 7, and an outer barrel 10 that is attached to riser pipe 6. Inner barrel 9 slides inside the outer barrel 10 with typical slipjoint strokes being in the order of 20–30 feet. Riser pipe 6 is kept under tension by a series of hydraulic/pneumatic rams known as "riser tensioners" 11 which are located around the slipjoint in a so called "moonpool area" 12 beneath the floating platform drill floor 7. (Moonpool area 12 is a hole in the center of the vessel through which drilling equipment is lowered to and retrieved from the sea floor.) A wire line and two sheaves (one sheave 13 mounted on a tensioner piston rod attached to riser tensioner 11 and the other sheave 14 attached to rig 1). Line 15 is wound through the sheaves with one end attached to slipjoint outer barrel 10 and the other end to the rig 1. This allows the tensioners 11 to maintain a constant (operator selected) tension on the riser pipe 6 while the piston/sheaves move up and down with the vessel/slipjoint motion.

Once blowout preventer 5 is landed on the bottom and riser 6 has been tensioned, drilling proceeds with drill string 2 lowered down and into the sea floor through riser 6 and blowout preventer 5. Vertical rig motion is uncoupled from the drill string 2 by heave compensator 16 located in the derrick above the top drive. During drilling, the well bore is lubricated by drilling "mud" which is pumped down the center of the drill string 2 and out through drill bit 3 where it is returned to the surface through riser 6. Large "mud pumps" on the drilling rig 1 continuously circulate the drilling mud.

Flexjoint 8 at the bottom and the slipjoint at the top allow for limited vessel horizontal displacement, but if the vessel displacement is too great (or anticipated to be so), the vessel/riser must be disconnected from blowout preventer 5 at the bottom before the displacement limit is reached. To allow this disconnection, blowout preventer 5 is made up of two sections, a lower section referred to as "the stack" 17 and an upper section called the lower marine riser package 18. When a disconnection occurs, the stack 17 remains on the bottom and the lower marine riser package 18 remains connected to riser 6.

Reasons for having to disconnect are due to either anticipated heavy weather (rig motions become too large in response to high winds and seas) or the inability of the vessel to remain on location over the well site (due to heavy weather, equipment malfunctions, and operator error). If sufficient time is available, the drill string is withdrawn to the rig before disconnecting the riser. However, equipment malfunctions and/or operator errors which result in rapidly degraded station keeping capability of the vessel can create a situation whereby an "emergency disconnect" is necessary. In this case there is not time to withdraw the drill string and an automated set of blowout preventer functions is commanded from the surface which result in drill string 2 being sheared off inside blowout preventer 5 by large hydraulic rams, the oil or gas well being closed off by additional blowout preventer rams, and lower marine riser package 18 being disconnected from the stack 17. Time to complete an emergency disconnect is in the order of 35–45 seconds (note that for each vessel, the precise time to carry out the automatic disconnect sequence is determined as part of periodic testing).

In the above instances, if the riser is not disconnected in time, the drilling equipment can be seriously damaged and in some cases a serious accident or oil spill could result. Conversely, if an emergency disconnect is made prematurely, in a situation where the displacement limit would not have been reached, the resultant monetary expenditure due to possible mud loss and the time required to reconnect (possibly having to retrieve the sheared portion of drill string 2 from within the well) and re-commence drilling operations could easily be in the order of hundreds of thousands of dollars.

Historically (due to offshore drilling starting in shallow water (500–1000 ft.) and the gradual movement from shallow to deep water drilling), the bottom flexjoint angle has been the sole parameter monitored to decide when to initiate an emergency disconnect. The angle is monitored through the use of dual axis tile sensors 19 and 21, the first located on riser 6 above the slipjoint, the other on the lower marine riser package. (Note that in some cases a third tilt sensor is used to monitor the top riser angle.) With a 10° flexjoint angle being the physical limit, alarms were typically set at 5° (the so called "yellow" warning alarm) and at 8° (the "red" emergency disconnect alarm). With increasing water depth, the traditional practice of monitoring the flexjoint angle and top riser angle to insure a maximum value of 10° begins to lose its effectiveness. There comes a point at which the slipjoint and/or tensioners will strokeout before the 10° flexjoint angle is reached. This has been dealt with up until now by reducing the yellow and red flexjoint alarm limits, but this is an over simplified approach which does not take into account the real factors affecting the efficient operation of the drill string and riser pipe at increased depth.

Systems for position monitoring are currently available. One such system is described in U.S. Pat. No. 4,205,379, issued May 27, 1980 to Fox, et al which is incorporated herein by reference for background details concerning techniques for deep offshore wells. FIG. 1 shows a prior art marine platform positioning system. Fox et al uses measured angles of the riser or drill string at the platform and at the floor and a special algorithm to determine the proper correction of the platforms horizontal position.

Systems such as described by Fox are helpful, but as the depth increases, more precise information is needed to avoid problems in many operating situations.

What is needed is a better system for monitoring disconnect parameters for very deep offshore wells.

SUMMARY OF THE INVENTION

The present invention provides a disconnect information and monitoring system for a dynamically positioned offshore drilling rig at an ocean surface rig location over a wellhead on the sea floor. The system includes a data processing computer, a GPS monitor, a flex joint angle monitor, a slip joint stroke position monitor, and signal equipment to feed signals from the GPS monitor, the flex joint angle monitor, and the slip joint stroke position monitor to the data processing computer. The computer is programmed with software to analyze signal data from the GPS monitor, the flex joint angle monitor and the slip joint stroke position monitor and to present the results of the analysis on the computer monitor so as to provide visual guidance to operators of the rig. In a preferred embodiment a riser top angle monitor and signal equipment for feeding signals from the riser top angle monitor to the data processing computer is also provided. In this preferred embodiment the computer is further programmed to display on a computer monitor a symbol representing the rig position relative to the wellhead and to display on the monitor symbols representing limits beyond which the rig should not travel to avoid damage to drill equipment. Another preferred embodiment provides a system and method for determining the curvature profile of the riser. Once the curvature profile has been determined, the operator can then minimize the curvature by adjusting the position of the drilling platform. This embodiment includes riser mounted instrumentation and acoustic telemetry packages positioned in intervals along the riser for producing x, y, z position signals in order to permit the operator to minimize the curvature profile.

BRIEF DESCRIPTION OF THE PREFERRED EMBODIMENT

DETAILED DESCRIPTION OF THE PREFERRED EMBODIMENT

First Preferred Embodiment

Figure 1:
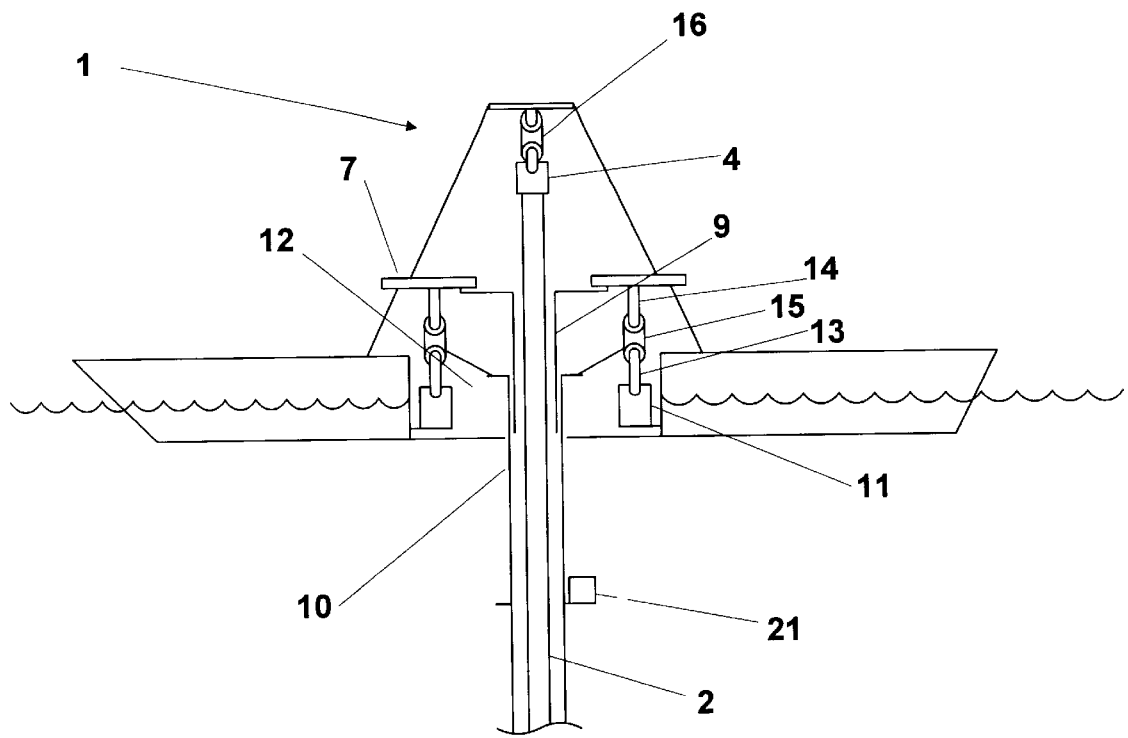
FIG. 1 is a prior art deep water drilling equipment configuration.
Figure 1:
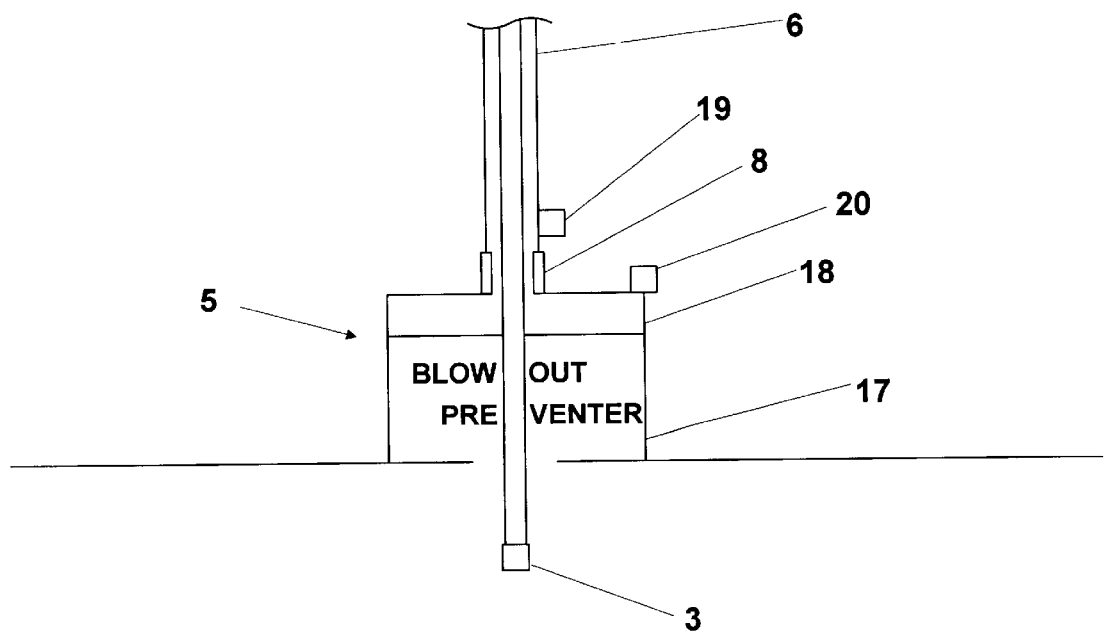
Figure 2:
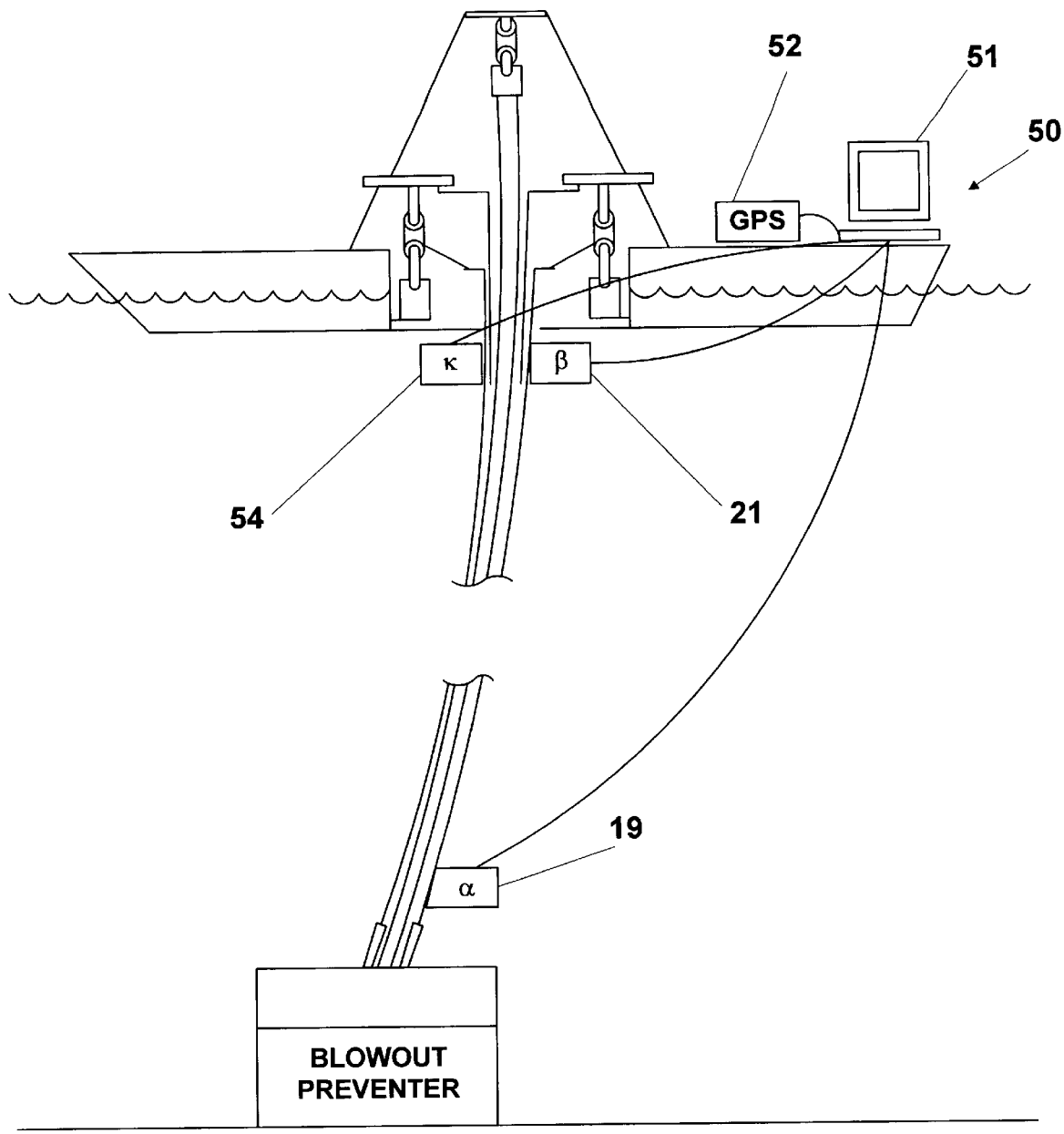
FIG. 2 is a drawing showing the elements of a preferred embodiment of the present invention.
Figure 3:
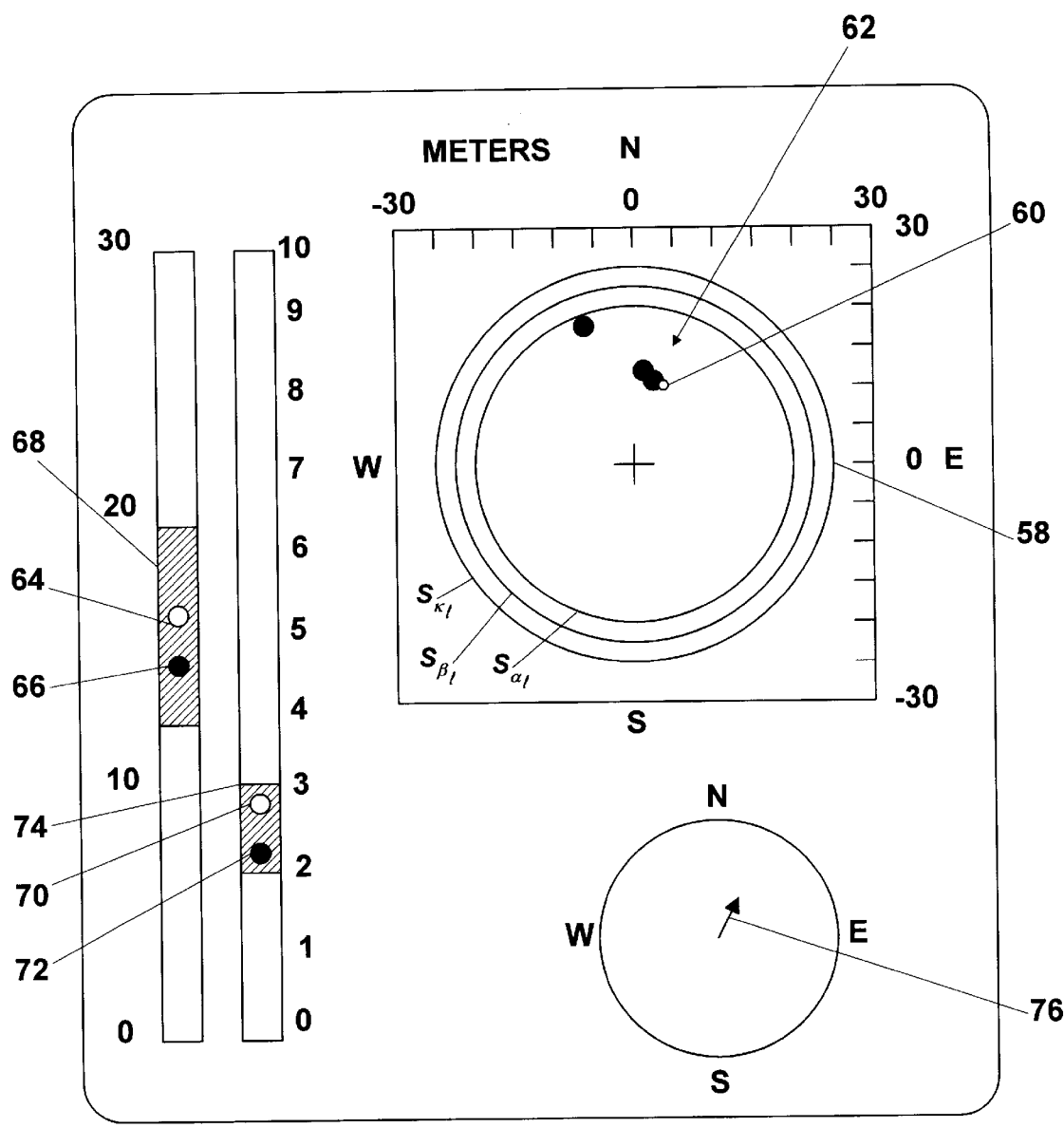
FIG. 3 shows how a monitor displays data the above preferred embodiment.

A first preferred embodiment of the present invention may be described by reference to FIGS. 2–4. This first preferred embodiment requires the following equipment and instrumentation systems.

(1) A data processing computer 50, such as a Cyber Research —VCR PENT—200 P with a 25 inch monitor, an ethernet card such as 3 com—Etherlink XL PCI and a standard keyboard mouse and a serial communication card.

(2) A differential GPS monitor 52 such as a Trimble 4000 DGPS receiver.

(3) A flex joint angle monitor 19 such as a model 900 clinometer supplied by Applied Geomechanics.

(4) A top riser angle monitor 21 also such as model 900 clinometer supplied by Applied Geomechanics.

(5) A slip joint stroke position sensor 54 such as a PSI Tronix DT420 displacement transducer.

(6) Appropriate signal equipment to feed GPS, flex joint angle and azimuth and slip joint position data to the data processing computer Items 2, 3 and 4 above are standard equipment on most deep-water off-shore drill rigs.

Data Collection

Data processing computer 50 is programmed to collect at 1-second intervals the following data:

(1) The rig's differential GPS position (latitude and longitude) from differential GPS monitor 52, (2) The slip joint position, which in this case has a range of 0 to 30 feet, from position sensor 54.

(3) The flex joint angle in azimuth and angle from angle monitor 19.

(4) The riser top angle in azimuth and angle from angle monitor 21.

DATA TREATMENT

Digital Filter

Data collected at 1-second intervals will be subject to instrument noise and all of the instrument readings are subject to wave action. Therefore, preferred embodiments of this invention will generally include some sort of digital filter. This is most important when using the differential GPS data to calculate speed since the speed calculations will typically involve a small difference of two large numbers. A simple digital filter is as follows:

$$(D_n)_f = D_n/20 + (19/20)(D_{n-1})_f$$

Where:

$(D_n)_f$ is the current filtered data point $(D_n)$ is the current unfiltered data point $(D_{n-1})_f$ is the previous filtered data point

GPS Position

Data processing computer 50 converts the differential GPS latitude and longitude data into an x-y position in an x and y coordinate system and where y is north and south and x is east and west and (0,0) is the x-y intersection. Computer 50 is programmed to store and display, by a 1-cm diameter red dot 60, the current GPS position on monitor 51 in the x-y coordinate system as shown in FIG. 2.

Slip Joint Position

Data processing computer 50 records and plots the current slip joint position as a 1-cm diameter dot 64 on monitor 51. It also plots a filtered value representing the current slip joint position absent noise and wave action effects as a 2-cm diameter blue dot 66 and it also plots a range 68 representing the maximum and the minimum position as green rectangle.

Flex Joint Angle

Computer 50 records and plots on monitor 51 the flex joint angle and azimuth direction. The current angle is plotted as a 1 cm red dot 70, and a filtered value is a 2 cm blue dot 72 and the range is plotted in green 74. A filtered azimuth value is plotted as a blue arrow 76, the length of the arrow being proportional to the flex joint angle.

Speed Calculation

The rig speed is calculated using the differential GPS values and an appropriate digital filter. A simple method of calculating a filtered speed, $[v_f]_n$, in feet per second is:

$$[(v_x)_f]_n = [(x)_n - (x)_{n-1}]/20 + [(x)_f]_{n-1}[19/20]$$

$$[(v_y)_f]_n = [(y)_n - (y)_{n-1}]/20 + [(v_y)_f]_{n-1}[19/20]$$

$$[v_f]_n = \sqrt{[(v_x)_f]_n^2 + [(v_y)_f]_n^2}$$

where for example: $[(v_x)_f]_n$ is the filtered velocity of the rig in the x direction at time n, $(v_x)_{n-1}$ is the filtered velocity of the rig in the x direction at time n−1 second.

Rig Position Projection

Computer 50 projects the rig position at 10 seconds, 30 seconds, 1 minute, 5 minutes and 10 minutes into the future. These positions are displayed on monitor 51 in 2 cm diameter dots of diminishing shades of blue. The red dot and three of the blue dots are shown at 62 in FIG. 3. The fifth dot is off the monitor. In the FIG. 3 example, (X)n=8 meters and (Y)n=4 meters. And [(vx)f)]n=3 cm/s and [(vy)f]n=−4cm/s. The rig's position 10 seconds in the future is calculated to be (x,y)=(8.3 m, 3.6m). At 1 minute the position is predicted to be (9.8 m, 1.6m). At five minutes the position is predicted to be (17 m, −8m). These values are shown on FIG. 3.

Calculation of Limits

Using the acquired data, computer 50 calculates the differential GPS positions at which emergency disconnects will be required to avoid equipment damage. In a preferred embodiment three sets of limits are calculated corresponding to the flex joint angle, the riser top angle and the slip joint position. These limits in this preferred embodiment will be in the form of three circles plotted on monitor 51, each circle having its origin at (0,0) position on the position chart.

Flex Joint Angle Limit

Figure 4:
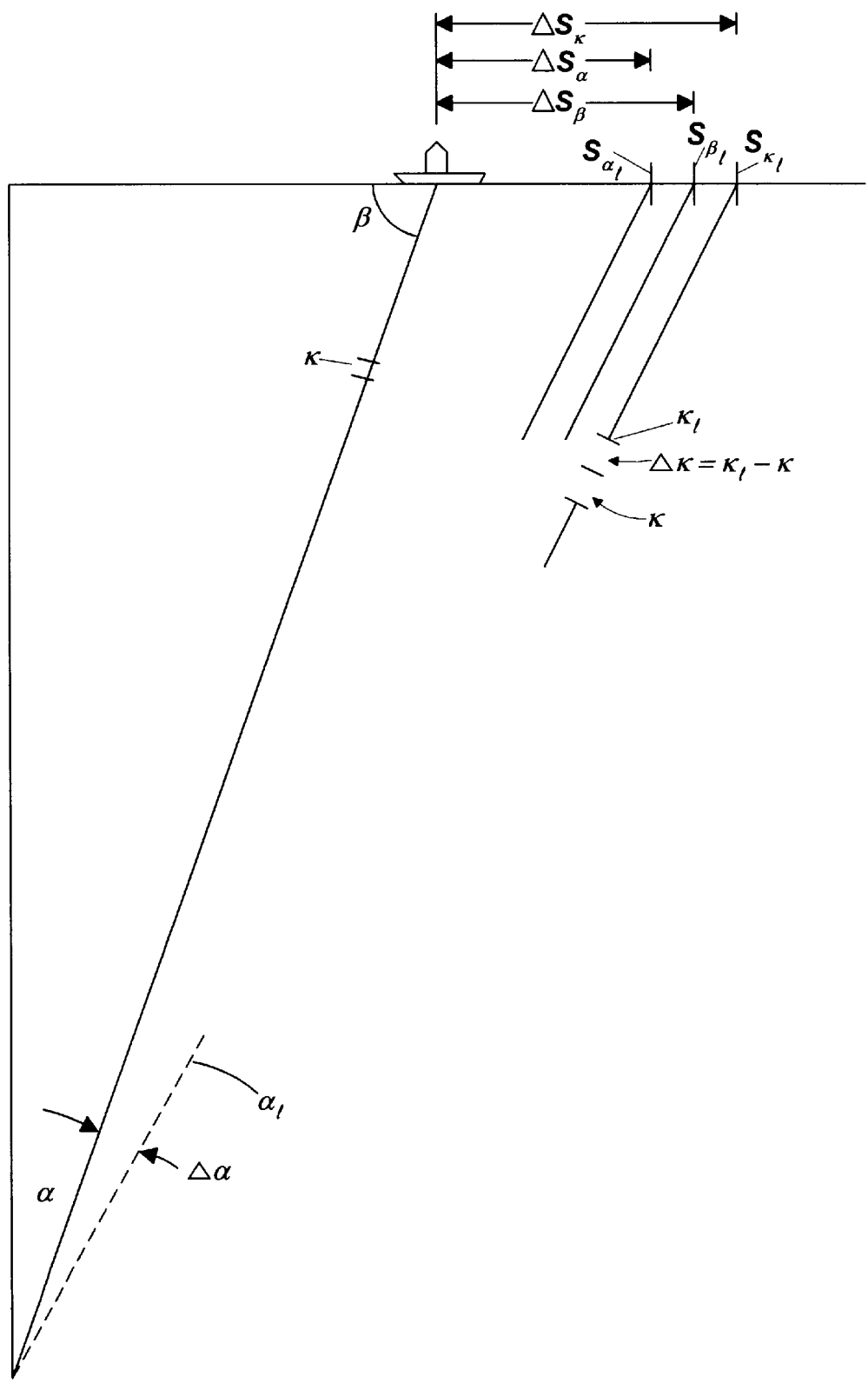
FIG. 4 shows certain data used in the calculation of limits.

The flex joint disconnect circle is determined by adding a $\Delta S_{60}$ value to the rig's $S_f$ position as indicated in FIG. 4. S is determined from the rig's actual GPS instrument. $\Delta S$ is determined by subtracting the current filtered flex joint angle from the maximum flex joint angle and multiplying the result by the minimum value of $\Delta S/\Delta\alpha$ in the 0 to 10° range of the flex joint angle. For a depth of 2000 feet (about 615 meters) that value is about 10 meters/degree so that:

Disconnect Limit, $(S_\alpha)_l$ $$(S_\alpha)_l = S + \Delta S_\alpha$$

$$= S + (\alpha_l - \alpha_p)(\Delta S/\Delta\alpha)_{min}$$

$$= S + (\alpha_l - \alpha_p)(10 \text{ meters/degree})$$

Where, $\alpha_l$ is the flex joint angle limit $\alpha_p$ is the present flex joint angle

Riser Top Angle Limit

The riser top angle disconnect circle is also determined by adding a $\Delta S\beta$ value to the rig's S position as indicated in FIG. 4. As in the case of the flex joint angle, $\Delta S$ is determined by subtracting the maximum permitted riser top angle from the present riser top angle and multiplying this $\Delta\beta$ value by the minimum value of $\Delta S/\Delta\beta$ within the permitted riser top angle range. For a depth of 2000 feet the estimated $(\Delta S/\Delta\beta)_{min}$ value is also 10 meters/degree so that:

Disconnect Limit, $(S_\beta)_l$ $$(S_\beta)_l = S + \Delta S_\beta$$

$$= S + (\beta_p - \beta_l)(\Delta S/\Delta\beta)_{min}$$

$$= S + (\beta_p - \beta_l)(10 \text{ meters/degree})$$

Where, $\beta_p$ is the present riser top angle, and $\beta_l$ is the riser top angle limit.

Slip Joint Limit

The slip joint limit circle is similarly determined by adding a $\Delta S_k$ value to the rig's present S position as indicated in FIG. 4. This $\Delta S$ is determined by subtracting the present slip joint position k from the maximum slip joint position $k_l$ and multiplying the resulting $\Delta k$ by the minimum value of $\Delta S/\Delta k$ in the slip joint range. That value for a 2,000 foot (615 meters) depth is about 5.5 at the limit of the slip joint. Note that at (0,0) $\Delta S/\Delta k$ is very large but for a 10 meter slip joint and 615 meter depth, 1 meter of slipage of the slip joint corresponds to only about 5.5 meters on the surface, so to be conservative with this simple modes a 5.5 ratio is recommended. Thus:

Disconnect limit, $(S_k)_l$ $$(S_k)_l = S + \Delta S_k$$

$$= S + (k_l - k)(\Delta S/\Delta k) \text{min}$$

$$= S + (k_l - k)(5.5)$$

In this preferred embodiments these three disconnect limits are plotted each second as circles on monitor 51 with the origin of each circle at the (0,0) coordinate.

Other Preferred Embodiments

The above embodiment will provide good information to the drilling rig operator regarding how close the rig is to dangerous limits. The algorithms are simple and easy to program using standard computer software and existing instruments. Much more rigorous assumptions and calculations could be used to make the predictions of danger limits. Some other alternative approaches are described in the preferred embodiments which are described below:

Instrumented Riser

When the riser shape deviates from the normal catenary shape (e.g., in high currents) the standard measurements of vessel position and top and bottom riser angle are insufficient to characterize the riser shape. In this case it may be desirable to further instrument the riser to obtain riser tilt and riser position measurements at points along the riser. This additional information is processed to provide an accurate estimate of both the riser and ocean current profile. With knowledge of the riser and current profile the minimum curvature vessel location can be determined.

Figure 5:
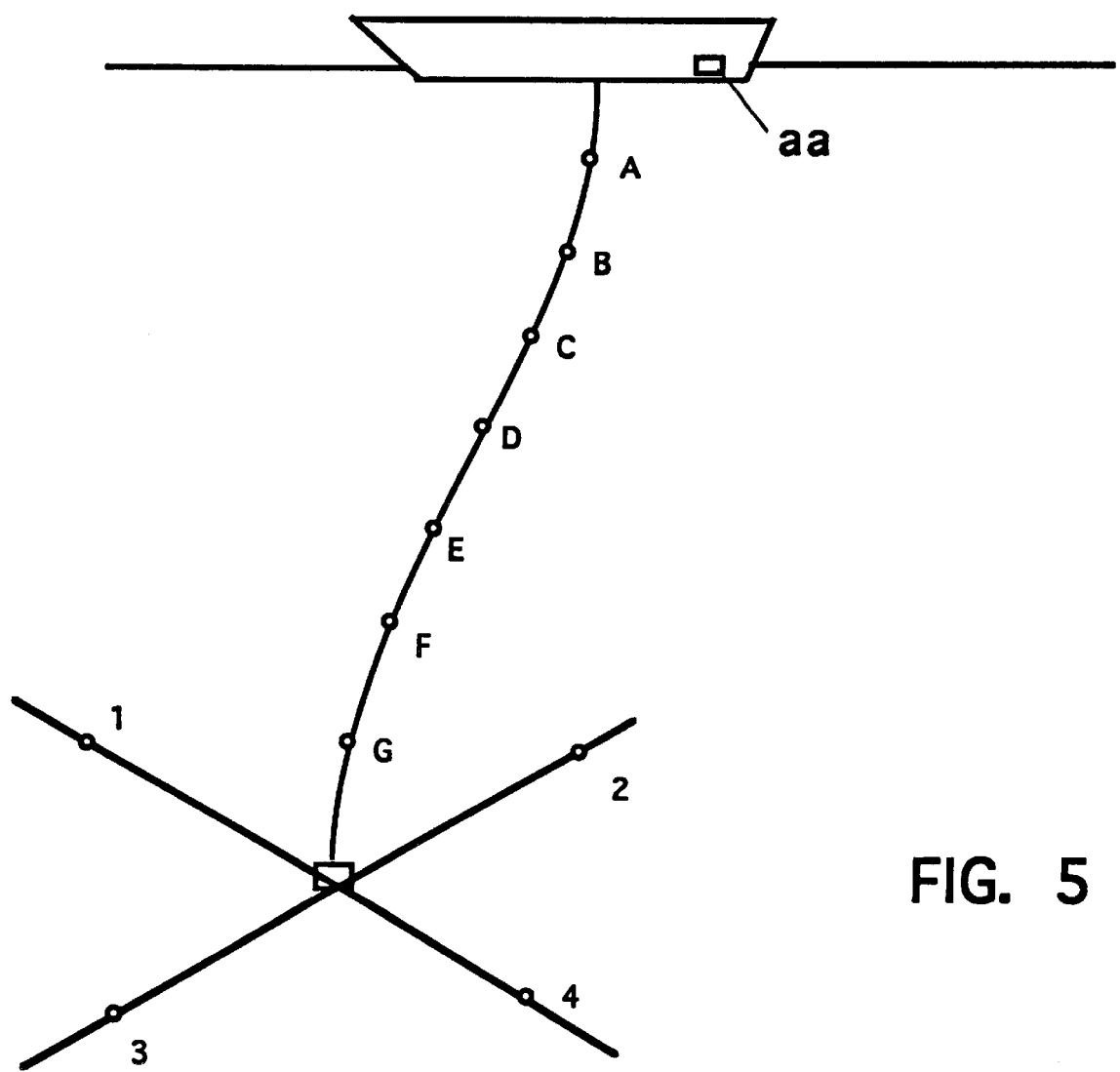
FIG. 5 shows an instrumented riser.

In this embodiment the invention incorporates an acoustic instrumentation system consisting of riser mounted instrumentation and acoustic telemetry packages (a,b,c,d,e,f), bottom mounted acoustic transceivers (1,2,3,4), and a vessel mounted hydrophone/projector (aa) and associated processing electronics to determine the riser tilt angle, and riser azimuth angle, and x,y,z position of the riser at the location of each of the riser mounted instrumentation and acoustic telemetry packages, all as shown in FIG. 5.

This additional information, along with the aforementioned drilling and vessel parameters, is processed in computer 50 to yield an estimated three dimensional (x,y,z) riser profile. Once the riser curvature profile is known, it is a relatively easy matter to determine an associated current velocity profile (speed and direction vs. depth). This information can be used to determine the x,y vessel position that will result in the minimum estimated riser curvature for the present riser configuration and estimated current profile.

Equipment

Equipment for this embodiment consists of the acoustic instrumentation system which is a combined long baseline position measurement system used to measure the x,y,z positions of the riser and instrumentation and acoustic telemetry system which is used to measure the riser tilt. This system can be provided by acoustic system suppliers such as Sonatech, Sonardyne, and Datasonics.

The acoustic system provided by Sonatech works as follows. The system is controlled through the vessel mounted hydrophone/projector (aa) via a computer work station and processing electronics (not shown). On a periodic basis (as controlled by the work station) each of the riser mounted instrumentation and acoustic telemetry packages (a,b,c,d,e,f) is queried via a coded acoustic signal transmitted from the projector. Each instrumentation package a—f contains a x,y tilt sensor and heading sensor. When the instrumentation package receives its acoustic signal, it samples the riser tilt and heading sensor, waits a fixed delay time from the time of signal receipt and then transmits the sampled data to the vessel hydrophone. At the surface, the time of arrival of the acoustic pulse is measured and the signal is processed to extract the encoded tilt and heading measurement data.

The acoustic pulse transmitted from the riser mounted instrumentation and acoustic telemetry packages a–f is also received at the bottom mounted transponders (1,2,3,4). The transponders, upon receiving the signal, wait a fixed delay time and then transmit a signal to the surface hydrophone. The arrival time of the bottom mounted transponder signals is measured at the surface. The acoustic system work station processes the measured arrival times to determine the x,y,z position of the riser mounted instrumentation and acoustic telemetry packages.

At the completion of processing, the riser tilt, heading, and position information is transmitted from the acoustic system work station to the data processing computer through a serial communications link.

Software

Additional software for this embodiment is located in the data processing computer. It consists of riser tilt processing to calculate the additional tilt and azimuth angles, an augmented riser estimator which processes the additional riser tilt and position information to yield the estimated 3-D riser and 3-D current profile, and processing to determine the minimum riser curvature vessel position.

Riser Tilt and Azimuth Calculations

This function calculates the riser angle and azimuth angle at an instrumentation location as tilt from vertical and azimuth direction of the tilt. The calculation is based on riser sensor geometry with the parameters used in the calculation being the instrumentation package measured x,y riser tilts and heading.

X, Y, Z Position Calculations

This function calculates the x,y,z position of the riser at the location of each of the riser mounted instrumentation and acoustic telemetry packages.

Existing Riser and Current Profile Calculations

The riser mathematical model models current drag forces on the riser and produces an estimate of the 3-D riser profile and 3-D current profile which optimally fits the measured data. The estimate is based on the riser tilt and azimuth angles and on the x, y and z positions of the riser mounted instrumentation and acoustic telemetry packages.

Minimal Curvature Vessel Position

This function determines the vessel position that results in minimal riser curvature (i.e., the vessel position that minimizes the maximum tilt angle). This position is determined through solution of the augmented catenary equations with zero vessel velocity (i.e., the static solution) by moving the x,y vessel position in the opposite direction (i.e., opposite to the angle) of the portion of the riser with the largest tilt. This is done, monitoring the estimated riser profile tilts until the maximum riser tilt is equal at two locations along the riser and any further x,y vessel movement results in one of the tilt vectors increasing in length.

While the above embodiments of the present invention have been described in detail, persons skilled in the art will recognize that the present invention may be practiced in many other embodiments. For example, as indicated much more rigorous calculational models may be substituted for the simple ones described above. A good example of this is the digital filter described. An alternative well known digital filter which could be used is the Kalman filter which has often been used in maritime applications. Various warnings may be added which could be visual and/or audio. Data displays may be customized to meet client operational requirements. The computer can be programmed to announce the time to reach a limit with the present vessel location and course. The computer can be programmed to store and/or log any of the data from the various monitors and calculation discussed above. Therefore, the scope of the present invention should be determined from the claims and their legal equivalents.

I claim:

1. A disconnect information and monitoring system for a dynamically positioned offshore drilling rig at an ocean surface rig location over a wellhead on the sea floor, said system comprising:

A) a data processing computer,

B) a GPS monitor,

C) a flex joint angle monitor,

D) a slip joint stroke position monitor,

E) signal equipment to feed signals from said GPS monitor, said flex joint angle monitor, and said slip joint stroke position monitor to said data processing computer, F) a computer monitor, said computer being programmed with software to analyze signal data from said GPS monitor, said flex joint angle monitor and said slip joint stroke position monitor and to display the results of the analysis on said computer monitor so as to provide visual guidance to operators of said rig.

2. A system as in claim 1 and further comprising a riser top angle monitor and signal equipment for feeding signals from said riser top angle monitor to said data processing computer.

3. A system as in claim 1 wherein said computer is further programmed display on said monitor a symbol representing the rig position relative to said wellhead.

4. A system as in claim 3 wherein said computer is further programmed to display on said monitor symbols representing limits beyond which the rig should not travel to avoid damage to drill equipment.

5. A system as in claim 4 wherein said computer is further programmed to project future rig locations based on information provided by said GPS monitor and at least one other monitor and speed calculations made by said computer using information provided by said GPS monitor.

6. A system as in claim 1 wherein said GPS monitor is a differential GPS monitor.

7. A system as in claim 2 wherein said computer is programmed with a digital filter.

8. A system as in claim 7 wherein said digital filter is a Kalman filter.

9. A disconnect information and monitoring system for a dynamically positioned offshore drilling rig at an ocean surface rig location drilling an offshore well through a riser connected to a wellhead on the sea floor, said system comprising:

A) a data processing computer,

B) a GPS monitor,

C) a flex joint angle monitor,

D) a slip joint stroke position monitor,

E) signal equipment to feed signals from said GPS monitor, said flex joint angle monitor, and said slip joint stroke position monitor to said data processing computer, F) a plurality of acoustic transceiver attached at a plurality of positions on said riser and associated signal equipment to transmit location information from said transceivers to said computer, said computer being programmed with software to analyze signal data from said GPS monitor, said flex joint angle monitor, said slip joint stroke position monitor and said acoustic transceivers and to present the results of the analysis so as to provide guidance to controllers of said rig.

10. A system as in claim 9 wherein said computer is further programmed to project future rig locations based on information provided by said GPS monitor and at least one other monitor and speed calculations made by said computer using information provided by said GPS monitor.

11. A system as in claim 9 wherein said GPS monitor is a differential GPS monitor.

12. A system as in claim 9 wherein said computer is programmed with a digital filter.

13. A system as in claim 9 wherein said digital filter is a Kalman filter.

14. A system for determining the curvature profile of a riser suspended from a floating marine platform and minimizing said curvature profile, wherein the length of said riser is many order of magnitudes greater than the relative horizontal displacement of the riser, said system comprising:

A. an angle sensing means for producing angle signals representing the tilt angles and azimuth angles of said flexible connecting line at positions defined by a plurality of riser mounted instrumentation and acoustic telemetry packages positioned in intervals along said flexible connecting line, B. a position determining means for producing x,y,z position signals of said flexible connecting line at positions defined by each of said riser mounted instrumentation and acoustic telemetry packages, C. a signal processing means for combining said angle signals and said position signals to determine said curvature profile and defining said curvature profile by output signals, and D. a position correction means for correcting said position of said platform in response to said output signals to minimize said curvature profile.

15. A system as in claim 14, wherein said plurality of said riser mounted instrumentation and acoustic telemetry packages, is at least six riser mounted instrumentation and acoustic telemetry packages.

16. A system as in claim 14, wherein said angle sensing means is a tilt sensor for said tilt angle and a heading sensor for said azimuth angle, and comprises:

A. a hydrophone/projector, and

B. said riser mounted instrumentation and acoustic telemetry packages, wherein each of said packages are periodically queried via a coded acoustic signal transmitted from said hydrophone/projector and each of said packages generates a response signal that is sent back to said hydrophone/projector.

17. A system as in claim 14, wherein said position determining means comprises:

A. a hydrophone/projector,

B. said riser mounted instrumentation and acoustic telemetry packages, wherein each of said packages are periodically queried via a coded acoustic signal transmitted from said hydrophone/projector and each of said packages generates a response signal, and C. a plurality of bottom mounted transponders, wherein each of said transponders receives said response signal and transmits said response signal to said hydrophone/projector.

18. A system as in claim 14, wherein said signal processing means to determine said curvature profile is a computer processing unit.

19. A system as in claim 14, wherein said position correction means for correcting said position of said platform is a computer processing unit.

20. A method for determining the curvature profile of a riser suspended from a floating marine platform and minimizing said curvature profile, wherein the length of said riser is many order of magnitudes greater than the relative horizontal displacement of the riser, said method comprising the steps of:

A. producing angle signals representing the tilt angles and azimuth angles of said flexible connecting line at positions defined by a plurality of riser mounted instrumentation and acoustic telemetry packages positioned in intervals along said flexible connecting line, B. producing x,y,z position signals of said flexible connecting line at positions defined by each of said riser mounted instrumentation and acoustic telemetry packages, C. combining said angle signals and said position signals to determine said curvature profile and defining said curvature profile by output signals, and D. correcting said position of said platform in response to said output signals to minimize said curvature profile.

21. A method as in claim 20, wherein said producing x, y, z position signals further comprises the steps of:

A. generating and transmitting from a hydrophone/projector a coded acoustic signal, B. receiving said coded acoustic signal at each of said riser mounted instrumentation and acoustic telemetry packages, C. producing at each of said riser mounted instrumentation and acoustic telemetry packages a response signal, D. transmitting said response signal to a plurality of bottom mounted transponders, and E. retransmitting said response signal from said plurality of bottom mounted transponders back to said hydrophone/projector.

22. A method as in claim 21, wherein said combining said angle signals and said position signals to determine said curvature profile and defining said curvature profile by output signals occurs in a computer processing unit.

* * * * *